(12) United States Patent
Lewtas et al.

(10) Patent No.: US 8,236,878 B2
(45) Date of Patent: Aug. 7, 2012

(54) COMPOSITION AND MANUFACTURE THEREOF

(75) Inventors: Kenneth Lewtas, Wantage (GB); Jean-Roch Schauder, Wavre (BE); Stijn Van Lierde, Lede (BE); Jurgen Schroeyers, Helchteren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 388 days.

(21) Appl. No.: 12/204,322

(22) Filed: Sep. 4, 2008

(65) Prior Publication Data

US 2009/0076212 A1    Mar. 19, 2009

(51) Int. Cl.
    *C08J 3/20*    (2006.01)
(52) U.S. Cl. ............ 523/351; 524/504; 525/55; 525/64; 525/69; 525/75; 525/86
(58) Field of Classification Search ............. 524/504; 525/55, 64, 69, 75, 86; 523/351
    See application file for complete search history.

(56) References Cited

U.S. PATENT DOCUMENTS

| | | | |
|---|---|---|---|
| 4,719,260 A * | 1/1988 | Stuart et al. ............... | 525/74 |
| 5,439,974 A * | 8/1995 | Mattson .................. | 525/74 |
| 6,525,157 B2 | 2/2003 | Cozewith et al. | |
| 6,559,262 B1 | 5/2003 | Waymouth et al. | |
| 6,770,713 B2 | 8/2004 | Hanke et al. | |
| 6,881,800 B2 | 4/2005 | Friedersdorf | |
| 7,276,557 B2 | 10/2007 | Macedo et al. | |
| 7,279,528 B2 | 10/2007 | Macedo et al. | |
| 2004/0236042 A1 | 11/2004 | Datta et al. | |
| 2005/0215964 A1 | 9/2005 | Autran et al. | |
| 2007/0068233 A1* | 3/2007 | Lewtas et al. ............ | 73/104 |

FOREIGN PATENT DOCUMENTS

| | | |
|---|---|---|
| EP | 0 088 510 | 3/1988 |
| EP | 1 002 809 | 8/1998 |
| EP | 1 070 087 | 7/2002 |
| EP | 1 561 762 | 8/2005 |
| EP | 1 017 729 | 9/2005 |
| EP | 1 233 191 | 11/2005 |
| EP | 1 614 699 | 1/2006 |
| WO | 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | 2005/105868 | 11/2005 |
| WO | 2005/105941 | 11/2005 |
| WO | 2007/067244 | 6/2007 |

* cited by examiner

*Primary Examiner* — Peter D Mulcahy

(57) ABSTRACT

A process for preparing a functionalized polymer composition and a functionalized polymer composition. The process comprises the steps of providing a hydrocarbon resin, a polyolefin and a graft monomer, and dispersing the hydrocarbon resin in the polyolefin, followed by adding the graft monomer under shear to prepare the functionalized polymer composition. The polyolefin can comprise a polyethylene polymer or a C3 to C40 polymer having a molecular weight (Mw) of at least 20000.

19 Claims, 4 Drawing Sheets

COMPOSITION AND MANUFACTURE THEREOF

CROSS REFERENCE TO RELATED APPLICATION

This application relates to and claims priority to Great Britain Patent Application Serial No. 0717376.8 entitled "Composition and Manufacture Thereof" which was filed on Sep. 7, 2007, the disclosure of which is incorporated herein by reference.

FIELD OF THE INVENTION

This invention relates to a composition and manufacture of a composition, particularly but not exclusively to a resin or polymer composition and its manufacture. The composition may be used, but is not limited to such use, in adhesives, adhesive components, polymer films and filaments, molded articles, rubber articles and coatings.

BACKGROUND

Relatively low molecular weight, amorphous resins (usually with molecular weights ranging from 400 to 2000) are useful in many applications, including tackifying agents for adhesives, ink additives, polymer additives, rubber and tyre additives, bitumen additives, road marking resins, paper sizing and pipe wrapping. The majority of these resins are apolar but many applications benefit from polarity. There are polar resins on the market but all have drawbacks such as instability or incompatibility with apolar or low polarity polymers. Certain commercial grades of tall oil rosin esters (TOREs) or terpene phenolic resins (TPRs) are used to improve the performance of ethylene vinyl acetate (EVA)-based hot-melt adhesives (HMAs) but are incompatible with non-polar polyolefins. TOREs also suffer from color instability and odour generation at application temperatures. Hydrocarbon resins, particularly hydrogenated cycloaliphatic resins, are superior in color stability and odour generation, but do not exhibit high all-around performance on polar surfaces, such as polyethylene terephthalate (PET) and acrylic varnishes, where TOREs are often used. The adhesive industry recognizes this problem but has yet to achieve a satisfactory solution.

Thus, a need exists for a hydrocarbon resin or an adhesive component having enhanced HMA performance without the instability and odour generation normally associated with TOREs or TPRs. In the area of polymer additives, it would also be advantageous to have effective polar resins which are compatible with non-polar polyolefins. This would improve the surface polarity and enhance adhesion, printability and corona treatment retention. In co-extruded films it would also enhance the film integrity at the interface between non-polar and polar polymers, e.g. between polypropylene (PP) and polyethylene-vinyl alcohol (EVOH). It would also help the dispersion of polar fillers such as PBT, $CaCO_3$, wood flour and nanocomposite materials. At first this desire seems contradictory but the invention described herein solves the problem.

EP 0 088 510 discloses a polar synthetic petroleum resin. A cyclopentadiene oligomer mixture is reacted with a carboxylic acid or anhydride such as phthalic or maleic acids and then hydrogenated. The reaction proceeds via the acid group reacting with the unsaturation of the resin oligomer thus forming an ester group at the point of attachment. The resulting resin product can be generally classified as a norbornyl ester.

Although the adhesive properties of compositions comprising polar synthetic resins disclosed to date are improved, their improvement is moderate. Also, the applications of these modified hydrocarbon resins and resin oligomers are limited mainly to adhesives. Another important drawback of these modified resins is the cost of manufacturing modified resins due to the large number of manufacturing steps which are necessary to produce the compositions.

The present invention aims to obviate or at least mitigate the above described problems and/or to provide improvements generally.

The grafted materials disclosed herein are believed to be produced through a different route, namely via an unsaturated bond of the acid or anhydride onto the resin which can have unsaturations but which are preferably at least partially hydrogenated and more preferably substantially hydrogenated.

Grafting functional components onto conventional hydrocarbon resins and/or resin oligomers and optionally combining the grafted resin or grafted oligomer material with another tackifying resin or other adhesive components improves performance and provides advantages over TOREs and TPRs when used in hot melt and other adhesive formulations. Particularly the performance of hydrocarbon resins, particularly hydrogenated aromatic cycloaliphatic resins, on polar surfaces can be improved by modifying the resins to include polar functionality.

SUMMARY OF THE INVENTION

According to the invention there are provided a composition and a process for preparing a composition as defined in any of one of the accompanying claims.

Furthermore, according to the invention, there are provided an adhesive, a film, a molded article, a process for preparing an adhesive, a film and a molded article as defined in any one of the accompanying claims.

The process of the invention results in a composition in which the hydrocarbon resin and the polyolefin are highly compatibilized. The hydrocarbon resin is compatible with its grafted counterpart. The polyolefin is compatible with its grafted counterpart, whilst the grafted polyolefin and grafted hydrocarbon resin are also compatible with each other through their common grafted components or through the formation of co-graft molecules between the hydrocarbon resin and the polyolefin. This results in a composition which has an improved compatibility over conventional functionalized compositions because in addition to the compatibility of the resin and the polyolefin with their respective grafted counterparts, both the grafted polyolefin and hydrocarbon resin are mutually compatible.

In a preferred embodiment, the hydrocarbon resin is dispersed in the polyolefin by means of a suitable mixer. The mixer may comprise a static mixer, a dynamic mixer, an extruder, and/or a combination of the aforesaid mixers. In a preferred embodiment, the mixer comprises a twin screw extruder. The mixer may provide the shear during the addition of the graft monomer. The shear rate of the mixer in the dispersion during the addition of the monomer may be at least 20 $s^{-1}$, preferably at least 40 $s^{-1}$, more preferably at least 50 $s^{-1}$, and most preferably at least 100 $s^{-1}$. The grafting efficiency and the homogeneity of the grafted blend increase with an improved level of dispersion.

The composition of the invention may be applied in a large number of products including adhesives, coatings, moulded products and films to enhance their product properties.

The invention provides compositions having a polar hydrocarbon resin in combination with an apolar polyolefin which are stable.

DETAILED DESCRIPTION OF THE INVENTION

Hydrocarbon Resin

Figure 1:
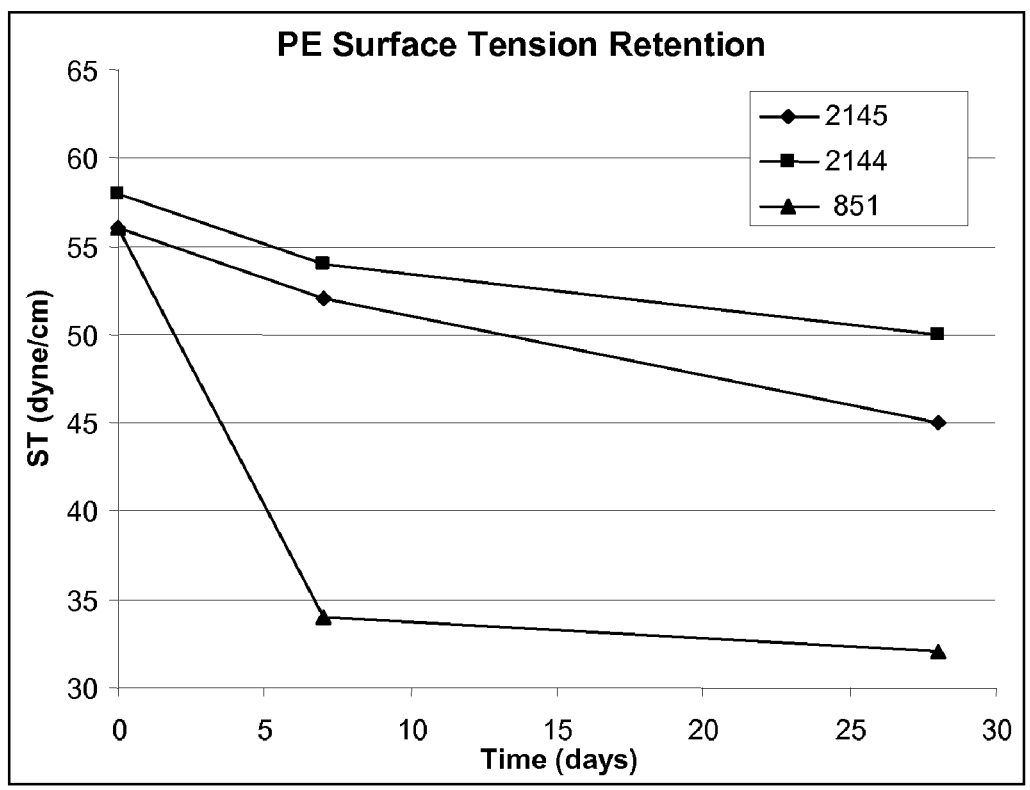
FIG. 1 presents the surface tension retention of a polyethylene film and polyethylene based compositions of the invention.

In an embodiment of the invention, the hydrocarbon resin is selected from the group consisting of: aliphatic hydrocarbon resins, at least partially hydrogenated aliphatic hydrocarbon resins, aliphatic/aromatic hydrocarbon resins, at least partially hydrogenated aliphatic aromatic hydrocarbon resins, aromatic resins, at least partially hydrogenated aromatic hydrocarbon resins, cycloaliphatic hydrocarbon resins, at least partially hydrogenated cycloaliphatic resins, cycloaliphatic/aromatic hydrocarbon resins, cycloaliphatic/aromatic at least partially hydrogenated hydrocarbon resins, polyterpene resins, terpene-phenol resins, rosin esters, rosin acids, grafted resins, and mixtures of two or more of the aforesaid resins. The hydrocarbon resin may be polar or apolar.

In one embodiment, the resin comprises hydrocarbon resins produced by the thermal polymerization of cyclopentadiene (CPD) or substituted CPD, which may further include aliphatic or aromatic monomers as described later. The hydrocarbon resin may be a non-aromatic resin or an aromatic resin. In one embodiment, the hydrocarbon resin has an aromatic content of 0-60%, preferably 1 to 60%, more preferably 1-40%, more preferably 1-20%, more preferably 10-20%, more preferably 15-20%, more preferably 1-10%, and more preferably 5-10%. We have discovered that addition of the graft monomer under shear to the dispersion of the hydrocarbon resin in the polyolefin allows grafting of non-aromatic hydrocarbon resins which is not possible in case of direct grafting of the resin alone.

In another embodiment, the resin comprises hydrocarbon resins produced by the catalytic (cationic) polymerization of linear dienes. Such monomers are primarily derived from Steam Cracked Naphtha (SCN) and include C5 dienes such as piperylene (1,3-pentadiene). Polymerizable aromatic monomers can also be used and may be relatively pure, e.g. styrene, methyl styrene, or from a C9-aromatic SCN stream. Such aromatic monomers can be used alone or in combination with the linear dienes previously described. "Natural" monomers can also be used, e.g. terpenes such as α-pinene, β-carene, and can be used alone or in high or low concentrations with other polymerizable monomers. Typical catalysts are $AlCl_3$ and $BF_3$ and can be used alone or complexed. Mono-olefin modifiers such as 2-methyl, 2-butene can also be used to control the molecular weight distribution (MWD) of the final resin. The final resin may be partially or totally hydrogenated as described elsewhere in this document (below).

As used herein, aromatic content and olefin content are as measured directly from the $^1$H NMR spectrum from a spectrometer with a field strength greater than 300 MHz, preferably 400 MHz. Aromatic content is the integration of aromatic protons versus the total number of protons. Olefin proton or olefinic proton content is the integration of olefinic protons versus the total number of protons.

In another embodiment, the resin is preferably at least partially hydrogenated and more preferably substantially hydrogenated. As used herein, at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons. The degree of hydrogenation is typically conducted so as to minimize and preferably avoid hydrogenation of the aromatic bonds.

Resins described herein are uniquely characterized by the fact that they are totally or substantially amorphous in nature. This means that a Glass Transition Temperature ($T_g$) is detectable, e.g. by Differential Scanning Calorimetry (DSC) but they have no Melting Point ($T_m$). To characterize such resins, the Industry chooses to use a test which roughly correlates with $T_g$, viz. Softening Point (SP) which gives values approximately, but not exactly. The SP of the resins are measured by a Ring and Ball Softening Point test according to ASTM E-28 (Revision 1996).

In one embodiment, the hydrocarbon resin to be grafted has a softening point of −30 to 200° C., more preferably 10 to 160° C., more preferably 60 to 150° C., more preferably 80 to 150° C. The resin may also be at least partially hydrogenated.

Typically, in an embodiment of the invention, the hydrocarbon resin has a number average molecular weight (Mn) of 400-3000, a weight average molecular weight (Mw) of 500-6000, a z-average molecular weight (Mz) of 700-15,000 and a polydispersity (PD) as measured by Mw/Mn between 1.5 and 4. As used herein, molecular weights (number average molecular weight (Mn), weight average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

In a further embodiment of the inventions, the hydrocarbon resin may comprise an oligomer such as dimers, trimers, tetramers, pentamers, and hexamers. The oligomers are preferably derived from a petroleum distillate boiling in the range of 30-210° C. The oligomers can be derived from any suitable process and are often derived as a byproduct of resin polymerization. Suitable oligomer streams have molecular weights (Mn) between 130-500, more preferably between 130-410, more preferably between 130-350, more preferably between 130-270, more preferably between 200-350, and more preferably between 200-320. Examples of suitable oligomer streams include, but are not limited to, oligomers of cyclopentadiene and substituted cyclopentadiene, oligomers of C4-C6 conjugated diolefins, oligomers of C8-C10 aromatic olefins, and combinations thereof. Other monomers may be present. These include C4-C6 mono-olefins and terpenes. The oligomers preferably comprise one or more aromatic monomers and are at least partially hydrogenated, more preferably substantially hydrogenated.

In one embodiment, the grafted oligomer material has an oligomer:graft monomer molar ratio between 50:1 and 1:2, more preferably between 10:1 and 2:1, more preferably between 5:1 and 2:1, more preferably between 1.5:1 and 1:1.5, and more preferably about 1:1.

In one embodiment, the oligomers are stripped from the resin before hydrogenation. In such an embodiment, the oligomers are preferably hydrogenated before grafting. In another embodiment, the oligomers are hydrogenated with the resin and then stripped from the resin, yielding a hydrogenated resin and hydrogenated oligomers. In another embodiment, at least some of the oligomers are stripped before hydrogenation and at least some hydrogenated oligomers are stripped after hydrogenation. In yet another embodiment, the hydrogenated resin/oligomers product may be further processed together as a single mixture as described below. In yet another embodiment, the oligomers can be derived from any suitable source and hydrogenated (if necessary) before grafting so that the oligomers before grafting are typically at least partially hydrogenated and preferably substantially hydrogenated.

In a preferred embodiment, the dispersing of the hydrocarbon resin in the polyolefin to form a dispersion and the addition of the graft monomer under shear to the dispersion, are conducted in a mixing vessel. The mixing vessel may be an extruder. Other suitable mixing apparatus known to the skilled person are also suitable for adding the graft monomer under shear to the dispersion.

Polyolefin

In an embodiment of the invention the polyolefin comprises a polyolefin having at least two carbon atoms (C2 or higher). The polyolefin may be produced by polymerization of an olefin monomer.

According to one aspect of the invention as disclosed herein, there is provided a composition comprising a hydrocarbon resin, a polyolefin comprising a polyethylene polymer, said polyolefin with a graft monomer, and said hydrocarbon resin with said same graft monomer. According to another aspect there is also provided a process for preparing the aforesaid composition. This composition has the important advantage that it is a suitable additive for polyethylene-based adhesives and films. The polyethylene may have a molecular weight (Mw) of greater than 100, preferably greater than 1000 and more preferably greater than 5000. The polyethylene may comprise a molecular weight of 100 to 30000, particularly 1000 to 20000. The polyethylene may also comprise a molecular weight of at least 20000, preferably at least 30000.

In a further embodiment, the molecular weight of the polyethylene may also be greater than 10000. This composition is particularly suited as an additive in high density polyethylene films.

In a further embodiment, the density of the polyethylene may be comprised between 0.86 and 0.96, more preferably between 0.865 and 0.94 g/cm$^3$.

According to another aspect of the invention as disclosed herein, there is provided a composition comprising a hydrocarbon resin, a polyolefin having at least three carbon atoms (C3 or higher) and having a molecular weight of greater than 50000, preferably greater than 100000, said polyolefin with a graft monomer, and said hydrocarbon resin with said same graft monomer. According to another aspect there is also provided a process for preparing the aforesaid composition. The polyolefin may comprise a molecular weight of greater than 70000, or greater than 80000, preferably greater than 90000, more preferably greater than 110000.

In a further embodiment, the polyolefin may comprise a block copolymer having at least three carbon atoms (C3 or higher). The polyolefin may also comprise a rubber. Suitable rubbers may include, but are not limited to, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

In another embodiment of the invention, the polyolefin may comprise a propylene-based polymer backbone. The propylene-based polymer backbone preferably comprises propylene, one or more C2 or C4-C20 alpha olefins, and optionally a non-conjugated diene. Most preferably, the propylene-based polymer backbone comprises propylene, ethylene, and optionally 5-ethylidene-2-norbornene (ENB) or a linear alpha-omega diene.

The polyolefin may comprise a polypropylene based copolymer. The polypropylene based copolymer may be a homopolymer with a level of isotacticity ranging from 50% to 99%. It can also be a random copolymer comprising propylene but also other monomers such as ethylene, butene, hexene or a combination of those. The propylene based polymer can also be a heterophasic polypropylene (ICP) having an isotactic PP phase and a dispersed rubber phase. In these cases, the melting point of the polypropylene will be between 165° C. and 120° C.

In a preferred embodiment, the propylene-based polymer backbone has a DSC melting point of about 120° C. or less, preferably about 115° C. or less, more preferably about 105° C. or less, more preferably about 100° C. or less, more preferably 90° C. or less, more preferably about 85° C. or less, and most preferably about 75° C. or less, and a heat of fusion of about 75 J/g or less, preferably about 70 J/g or less, more preferably about 65 J/g or less, and most preferably about 60 J/g or less. The propylene-based polymer backbone is preferably a propylene-ethylene copolymer, preferably with a propylene content of at least about 75 wt % and ethylene content in the range of about 4 wt % to about 25 wt %, more preferably about 5 to about 24 wt %, more preferably about 7 to about 20 wt %, more preferably about 7 to about 16 wt %, and most preferably about 8 to about 15 wt %. In further embodiments, the propylene-based polymer backbone preferably comprises a suitable grade of VISTAMAXX™ elastomer (ExxonMobil Chemical Company, Baytown, Tex., USA), a suitable grade of VERSIFY™ polymer (The Dow Chemical Company, Midland, Mich., USA), a suitable grade of Tafmer™, a suitable grade of Notio™ (The Mitsui Company of Japan), or a suitable grade of Softel™ (Basell Company of the Netherlands).

Suitable methods for producing the propylene-based polymer backbones are found in U.S. Patent Application Publication No. 2004/0236042 and U.S. Pat. No. 6,881,800, which are incorporated herein by reference.

In another embodiment, the propylene-based polymer backbone may include copolymers prepared according the procedures in WO 02/36651, which is incorporated herein by reference. Likewise, the propylene-based polymer backbone can include polymers consistent with those described in WO 03/040201, WO 03/040202, WO 03/040095, WO 03/040201, WO 03/040233, and/or WO 03/040442. Additionally, the propylene-based polymer backbone can include polymers consistent with those described in European Patent No. 1 233 191, and U.S. Pat. No. 6,525,157, along with suitable propylene homo- and co-polymers described in U.S. Pat. No. 6,770,713 and U.S. Patent Application Publication No. 2005/0215964, all of which are incorporated herein by reference. The propylene-based polymer backbone can also include one or more polymers consistent with those described in European Patent Nos. 1,614,699; 1,017,729; 1,561,762 or 1,002,809, also incorporated herein by reference.

The monomers of the propylene-based polymer backbone are preferably polymerized in the presence of a chiral metallocene catalyst system (i.e., preferably a chiral metallocene pre-catalyst in combination with an activator and optionally a scavenger). The comonomer or comonomers of the propylene-based polymer backbone used in combination with propylene may be linear and/or branched. Preferred linear alpha-olefins include ethylene or C4 to C8 alpha-olefins, more preferably ethylene, 1-butene, 1-hexene, or 1-octene, even more preferably ethylene or 1-butene. Preferred branched alpha-olefins include 4-methyl-1-pentene, 3-methyl-1-pentene, and 3,5,5-trimethyl-1-hexene.

Typically, propylene-based polymer backbones useful in this disclosure are obtained by using catalysts that allow control of polymer tacticity. Generally these catalysts are used in combination with comonomers and/or the polymerization temperature to manipulate the level of tacticity. Useful catalysts are typically those that are capable of a level of stereoregular placement, generally by suitable chirality of a single site catalyst. Such catalysts are typically a transition metal complex generally containing a transition metal from Group 3, 4, 5, 6, 7, 8, 9 or 10 of the Periodic Table; and at least one ancillary ligand that remains bonded to the transition metal during polymerization. Preferably, the transition metal is used in a reduced cationic state and stabilized by a co-catalyst or activator. The ancillary ligand may be a structure capable of forming a bond such as cyclopentadienyl type ring structure. The ancillary ligand may also be a pyridinyl or amide ligand. The transition metal is preferably of Group 4 of the Periodic Table such as titanium, hafnium, or zirconium, which is preferably used in polymerization in the d0 monovalent cationic state and preferably has one or two ancillary ligands. For coordination polymerizations, such catalysts typically have a ligand capable of abstraction and a ligand into which the ethylene (olefinic) group can be inserted. All numbers and references to the Periodic Table of Elements are based on the new notation as set out in Chemical and Engineering News, 63(5), 27 (1985).

Pyridine amine complexes, such as those described in WO 03/040201, are also useful to produce the propylene-based polymer backbones described herein. The catalyst may be a fluxional complex, which undergoes periodic intra-molecular re-arrangement so as to provide the desired interruption of stereoregularity, as in U.S. Pat. No. 6,559,262. The catalyst may be a stereorigid complex with mixed influence on propylene insertion, see European Patent No. 1 070 087. The catalyst described in European Patent No. 1 614 699 could also be used for the production of backbones suitable for the present invention.

In another embodiment, the propylene-based polymer backbone may comprise copolymers prepared according the procedures in WO 02/36651. Likewise, the propylene-based polymer backbone may comprise polymers consistent with those described in WO 03/040202, WO 03/040095, WO 03/040201, WO 03/040233, and/or WO 03/040442. Additionally, the propylene-based polymer backbone may comprise polymers consistent with those described in European Patent No. 1 233 191, and U.S. Pat. No. 6,525,157.

The propylene-based polymer backbone may be produced via a single site catalyst polymerization process or a process involving two or more single site catalysts. In some embodiments, the single site catalyst incorporates hafnium. The propylene-based polymer backbone may be produced in a single reactor process or be produced in a process using either series reactors or parallel reactors. In the latter case, the polymers produced in the two reactors may have the same composition or different compositions.

The propylene-based polymer backbone may be a homopolymer which contains a certain number of errors resulting from stereo or regio insertion errors during propylene polymerization; these errors allow reduction in crystallinity and melting point. The propylene-based polymer backbone can also be a copolymer. In this case, the crystallinity and melting point reduction result from either propylene insertion errors or from the introduction of one, two, or three co-monomers. Generally, the propylene-based polymer will mainly comprise propylene in sufficient amounts for the propylene sequences to crystallize and have a detectable heat of fusion. This is in contrast to known traditional Ziegler-Natta elastomeric polymers, based on ethylene and propylene, in which the heat of fusion can be attributed to ethylene-derived polymer sequences as they lack the propylene tacticity.

In a further embodiment of the invention, the polyolefin is selected from the group consisting of: polyethylene, an ethylene α-olefin (C3-C20) copolymer, polypropylene, a propylene α-olefin (C4-C20) copolymer, polybutylene, a butylene α-olefin (C5-C20) copolymer, a polyisobutylene polymer, α-olefin diene copolymers, block copolymers comprising styrene and a conjugated diene, and mixtures of two or more thereof.

The composition may further comprise at least one polar polymer. The polar polymer may be selected from the group consisting of polyesters, polyamides, polyureas, polycarbonates, polyacrylonitriles, polyacrylates, polymethylacrylates, ethylene vinyl acetate copolymers, polyvinyl chloride, polyethylene terephthalate, polybutylene terephthalate, polyacetals, ethylmethyl acrylate, ethylbutyl acrylate, and mixtures of two or more thereof.

A mixture of two or more of any of the above mentioned polymers may be used in this invention.

The term "MFR" as used herein stands for "Melt Flow Rate" and is used to characterize polymers, components and compositions. The test for determining MFR is set forth in ASTM D 1238. The term "MI" or melt index is used for polyethylene and is also defined in ASTM D 1238. From the MFR and MI the molecular weight of the polyolefin can be derived.

Grafted Hydrocarbon Resin

As used herein, a grafted hydrocarbon resin, oligomer, and/or resin material, or a combination thereof means it has been combined, contacted, and/or reacted with a graft monomer. Grafting is the process of combining, contacting, or reacting the hydrocarbon resin, oligomers and/or resin material with the graft monomer. Grafting hydrocarbon resins, oligomer, and/or resin material, or a combination thereof to include at least some polar functionality produces useful components for many applications such as adhesive formulations, especially HMA formulations. These formulations are often designed for use with polar polymers, such as EVAs, ethylmethyl acrylates (EMAs), polyacrylates (PAs), polymethacrylates (PMAs), ethylene alkyl acrylates and for use on polar substrates, such as PET, recycled paper, cardboard, and acrylic varnishes and work well on other substrates such as wood, glass, ceramic, asphalt, concrete, and metal.

Accordingly, in embodiments of the present invention, the composition includes a hydrocarbon resin and a polyolefin in combination with their grafted counterparts. The composition may further comprise (i) grafted hydrocarbon resins; (ii) grafted oligomers, (iii) grafted oligomers in combination with ungrafted resin(s), (iv) grafted hydrocarbon resin in combination with ungrafted resin(s), (v) grafted hydrocarbon resin in combination with ungrafted oligomers, (vi) grafted hydrocarbon resin in combination with grafted oligomers, (vii) grafted oligomers in combination with ungrafted oligomers or (viii) grafted hydrocarbon resin in combination with grafted oligomers in combination with ungrafted resin(s) and other suitable combinations of one or more thereof. The embodiments described herein also include processes for making and using the previously described materials.

In one embodiment, the weight ratio of graft monomer:resin in a grafted resin product is preferably between 1:1000 and 1:1, more preferably between 1:100 and 1:1, more preferably between 1:50 and 1:1, more preferably between 1:10 and 1:1, more preferably between 1:3 and 1:1, and even more preferably between 1:100 and 3:10.

As the composition of the inventions comprises a grafted hydrocarbon resin and a grafted polyolefin, the composition is compatible with the aforesaid adhesives and adhesive components.

Grafted Oligomers

As discussed, in an embodiment of the invention, the hydrocarbon resin may be an oligomer. This results in a composition comprising both oligomers and grafted counterpart oligomers.

As stated, both the resins and oligomers preferably comprise one or more aromatic monomers. We have found that an aromatic material yields better performance in adhesives comprising aromatic-containing graft material. Additionally, certain graft monomers, such as maleic anhydride, have good solubility in an aromatic-containing material which probably allows for a more homogeneous reaction phase and likely avoids undesirable byproducts during the grafting reaction.

Graft Monomers

In an embodiment of the invention, the graft monomer is selected from acids, anhydrides, imides, amides, alcohols and/or derivatives thereof.

Preferred graft monomers include any unsaturated organic compound containing at least one olefinic bond and at least one polar group such as a carbonyl group, which includes unsaturated acids and anhydrides and derivatives thereof. Preferably, the organic compound contains an ethylenic unsaturation conjugated with a carbonyl group ($-C=O$) and preferably contains at least one $\alpha,\beta$ olefin bond. Examples include carboxylic acids, acid halides or anhydrides, phenols, alcohols, ethers, ketones, alkyl and aromatic amines, nitriles, imines, isocyanates, nitrogen compounds, halides and combinations and derivatives thereof. Representative acids and acid derivatives include carboxylic acids, anhydrides, acid halides, esters, amides, imides and their salts, both metallic and non-metallic. Examples include maleic, fumaric, acrylic, methacrylic, itaconic, aconitic, citraconic, himic, tetrahydrophthalic, crotonic, $\alpha$-methyl crotonic, and cinnamic acids. Maleic anhydride is a particularly preferred graft monomer. Particular examples include, itaconic anhydride, citraconic anhydride, methyl acrylate, methyl methacrylate, ethyl acrylate, ethyl methacrylate, glycidyl acrylate, monoethyl maleate, diethyl maleate, dibutyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. A mixture of two or more of the aforementioned graft monomers may be used.

In a further embodiment, the graft monomer is added together with a free radical initiator. The free radical initiator may be selected from the group consisting of peroxides, comprising benzoyl peroxide, dichlorobenzoyl peroxide, dicumyl peroxide, di-tert-butyl peroxide, 2,5-dimethyl-2,5-di(peroxybenzoate)hexyne-3,1,4-bis(tert-butylperoxyisopropyl)benzene, lauroyl peroxide, tert-butyl peracetate, 2,5-dimethyl-2,5-di(tert-butylperoxy)hexyne-3,2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate, tert-butyl hydroperoxide, tert-butyl perdiethylacetate, azoisobutyronitrile, dimethyl azoisobutyrate, and mixtures of two or more thereof.

The peroxide preferably has a half-life of about 7 times the residence time in the reactor at processing temperature. Preferred peroxides include di-tert-butyl peroxide and 2,5dimethyl-2,3-di(tert-butylperoxy)hexane. The amount of peroxide combined is typically dependent on the weight of the graft monomer. In one embodiment, the weight ratio of the graft monomer:peroxide in the reaction mixture may be between 1:1 and 100:1, more preferably between about 2:1 and 50:1, more preferably between about 5:1 and about 20:1 and even more preferably about 16:1.

The graft monomer, once reacted with the resin/polymer mixture, may be further reacted in situ or by a separate process. For example, if maleic anhydride is used as the graft monomer it may be further reacted with a variety of reactive molecules such as amines or alcohols, e.g. a primary amine.

Other molecules called charge transfer complex agents can also be used to enhance the level of grafting. Such molecules comprise but are not limited to styrene and substituted styrenes.

The composition of the invention may comprise: a hydrocarbon resin; a polyolefin; said polyolefin with a graft monomer, and; said hydrocarbon resin with said same graft monomer.

The composition of the invention is prepared by providing a hydrocarbon resin, providing a polyolefin, providing a graft monomer and dispersing the hydrocarbon resin in the polyolefin, followed by adding the graft monomer under shear to said composition.

In the process of the invention, a composition is prepared which comprises both a resin and a polyolefin polymer in combination with their grafted counterparts. The hydrocarbon resin and the polyolefin are first intermixed or dispersed before the graft monomer is added. In this way, the resulting composition comprises both grafted and ungrafted components. The graft monomer is preferably added under shear such as during mixing to promote simultaneous grafting of both the resin and the polyolefin.

In a particularly preferred embodiment, the resin, polymer and graft monomer are mixed in a reactor or extruder. This obviates the need for a further additional process step as the resulting functionalized composition is the extruded product. The extruded product may be the final product.

In an embodiment the graft monomers may be admixed with the resin and the polyolefin at a temperature between 50-300° C., preferably 50 to 200° C., more preferably between 70-150° C., more preferably between 70-125° C., more preferably between 140-180° C., more preferably between 140-180° C., more preferably between 155-165° C. or between 165-175° C. and at a pressure of typically one atmosphere but higher pressures may be used if necessary. Typically, the graft monomers may be admixed with the resin and the polyolefin at a temperature between 180° C. to 200° C.

In another embodiment, the graft monomer may be added in an amount so that the weight ratio of graft monomer:resin material is less than 1:1, more preferably less than 5:10, more preferably less than 3:10, even more preferably less than 3:20, and most preferably less than 5:50. In a preferred embodiment, the reaction mixture is maintained in a homogenous state. The reaction mixture is preferably agitated or stirred vigorously. A free radical initiator may be combined with the resin/polyolefin-graft monomer reaction mixture either in one addition or preferably in a continuous or semi-continuous mode during the reaction. Residence time in the reaction zone is preferably less than 75 minutes, more preferably less than 60 minutes, even more preferably between 30-60 minutes. If the composition of the invention is prepared in an extruder, then typical residence times are 10 seconds to 3 minutes, typically 1 to 3 minutes.

The amount of graft monomer added is typically dependent on the amount of polymeric blend. The graft monomer:resin weight ratio in the reaction mixture is preferably less than 1:5, more preferably less than 1:10, more preferably less than 1:20, and even more preferably about 1:40.

In an embodiment, the composition is transparent and nearly colorless. The composition may have a Yellowness index of pellets (YIP) following ASTM E 313 (revision 1998) using a spectrophotometer of less than 30, typically less than 25 and preferably less than 22.

In an embodiment, grafting of the resin/polyolefin may also be conducted via a solution route wherein the resin material dispersed in a solvent and combined, contacted and/or reacted with the graft monomer. Additionally or alternatively, the graft monomer may be dispersed in a solvent prior to adding to the resin material. These routes allow for lower reaction temperatures (as low as 100° C.) and allow the choice of different peroxides having half-lives of 6 minutes at the lower reaction temperatures. Suitable solvents include, but are not limited to, aliphatic solvents, cycloaliphatic solvents, aromatic solvents, and aromatic-aliphatic solvents. Typical examples include benzene, toluene, xylene, biphenyl, chlorobenzene, n-pentane, n-hexane, n-heptane, n-octane, n-decane, iso-heptane, iso-decane, iso-octane, cyclohexane, alkyl cyclohexane, and combinations of two or more thereof. Aromatic solvents are the most preferred in order to avoid solvent grafting.

It is believed that the graft monomer is grafted to the resin material through an olefinic bond of the graft monomer such as an $\alpha,\beta$ olefinic bond. It is believed that by grafting the oligomers via this route, the formation of norbornyl ester groups in the grafted resin material is minimized and preferably avoided. The resulting grafted oligomers are preferably at least one of a (i) a mono-alkyl succinic acid, anhydride or derivative thereof, or (ii) a $\beta$-alkyl substituted propanoic acid or derivative thereof. The reaction product of the resin material and graft monomer or the product of the combination of the resin material and the graft monomer may also include some oligomers of the graft monomer, which may or may not be removed before formulating a final composition.

The composition of the invention may be further diluted with the same or a different polyolefin in one or more stages following grafting.

In an embodiment, the composition of the invention is used as an adhesive.

The composition of the invention may be used as an additive. In particular, the composition of the subject inventions find their utility as admixtures with higher molecular weight polymers. As the composition comprises a cross-compatibilized mixture of the hydrocarbon resin, polyolefin and their grafted counterparts, the mixture is compatible with a large number of other compositions. The compatibility can be further increased by selecting hydrocarbon resins and/or polyolefins which are compatible with the components of the other composition into which the composition of the invention is admixed. For example, if the other composition comprises polar hydrocarbon resins, then compatibility of the composition of the invention is enhanced by selecting a polar hydrocarbon resin in the composition of the invention.

The composition of the inventions may be admixed as an additive in the following non-limiting examples of the mixtures as follows:

Adhesives applications, especially Hot Melt Adhesives (HMA), Pressure Sensitive Adhesives (PSA—which may themselves be HMAs). These adhesives may be manufactured by mixing the composition of the inventions with polymers such as non-polar polyolefins (e.g. Atactic Poly-$\alpha$-olefins (APAOs)), ethylene-based polyolefins (e.g. Plastomers such as Exact™ polymers from ExxonMobil Chemical), propylene-based polyolefins (e.g. polypropylene (PP) including propylene-alpha olefin copolymers, ethylene-polar monomer-based polymers (e.g. ethylene-vinyl acetate copolymers (EVA), ethylene-acrylic acid/ester-based polymers (EAA)), acrylic acid/ester-based polymers (e.g. poly-methyl acrylates (PMA)), Styrenic block copolymers (SBC) (e.g. styrene-isoprene-styrene (SIS) polymers which may also include varying amounts of di-block (SI) and also includes partially hydrogenated products (e.g. styrene-ethylene-butene-styrene (SEBS) polymers where the mid-block is selectively hydrogenated leaving the aromatic rings intact).

Polymer Film applications are a particularly preferred embodiment of this invention. Here the composition of the invention is combined, usually with high shear mixing with additional polymers prior to making a film which may or may not be oriented. Especially note that this includes both the final finished film and any such masterbatch (MB) of the composition and additional polymers used to add to the mixture prior to making the final finished film. Examples of polymers used to make films are non-polar polyolefins such as polyethylene (PE) and polypropylene (PP), polar polymers such as polyesters (polyethylene terephthalate, PET), polystyrene (PS), polyamides (PA), polyethylene-polar monomer such as EVA, etc.). The film may be a monolayer film, a multilayer co-extruded film with thin skin layers and/or multiple internal layers. Examples of such co-extruded films are biaxially oriented polypropylene (BOPP) films which generally comprise a core layer of polypropylene and two thin skin layers of a lower crystallinity polymer (PP-PE random copolymer (RCP)) used to aid sealing behaviour. Examples of more complicated co-extruded film structures include films with layers of different polarity to impart special performance characteristics (e.g. EVOH barrier layers). Polymer films may also be filled with either inert fillers (e.g. inert fillers such as $CaCO_3$, PBT to created sites to aid cavitation of films, functional fillers such as pigments (e.g. organic pigments, $TiO_2$, etc.) and stiffness/barrier improvements (e.g. nano-composites). Polymer films may also be coated to impart further desirable properties to the film (e.g. polyvinylidene dichloride (PVDC), acrylic acid/esters, etc.).

The composition of the invention may also be used as an additive in co-extruded or laminated films which may comprise a film layer in addition to one or more further substrates.

The composition of the invention may also be added to a moulding polymer prior to a moulding process (as described above, this may be directly or the composition may be provided as a master batch). Examples of moulding processes are injection moulding, blow moulding, rotoforming, thermoforming, etc. The variety of applications means that a wide variety of moulding polymers may be used. Suitable moulding polymers may comprise polyolefins, (PE and PP are often used for many mass-produced articles such as disposable containers), engineering thermoplastics (PA, poly-phenylene oxides (PPO) or sulphides (PPS). Here again it can be clearly seen that the grafted resin/polymer mixture provided by this invention would enhance the dispersion of fillers (e.g. glass fibers, $CaCO_3$, Wollastonite, talc, micas, metal hydrates and short natural fibers such as wood pulp, wood flour, and long natural fibers such as sisal) and property improvers (e.g. colour masterbatches, anti-oxidants)

The composition of the inventions may be provided as an additive in polymer filament extruded applications. In polymer filament extrusion, a filament polymer is extruded (sometimes termed "spun" because of the fine nature of the filament being similar to sun fabrics) in fine filaments to form the finished article. Examples of such processes are spun-bond polypropylene to form non-woven (NW) fabrics, extruded elastomer strands which are often combined with other films or sheets (e.g. polypropylene non-woven) to impart elasticity to articles such as disposable sanitary items (e.g. diapers, training pants, etc.).

The composition may also be provided as in additive in combination with rubbers and/or elastomers to modify their properties. In this respect, the compositions may be used to modify the rubbers/elastomers to improve their properties for applications such as tyres, belts, seals, etc. The compositions of the invention provide improved building tack (or green tack), better lamination integrity, better dispersion of fillers and modification of the rubber-elastic response which, in the case of tyres, influences rolling resistance, traction/wet grip and abrasion resistance.

Finally, the composition may be used as an additive in a number of other applications including paint/ink mixtures, bitumen, road marking compositions, pipe-wrapping compositions, sealants, etc.

We will now describe various of the above applications of the composition in further detail.

Additives

The composition of the inventions may be used as a direct additive or admixed with other additives well known in the art such as processing oils, performance oils, anti-block, anti-static, antioxidants, cross-linking agents, silica, carbon black, talc, pigments, fillers, processing aids, UV stabilizers, neutralizers, lubricants, anti-slip agents, slip agents, surfactants and/or nucleating agents. Examples of common additives include: antioxidants such as Irganox® 1010, silicon dioxide, titanium dioxide, polydimethylsiloxane, talc, dyes, wax, calcium stearate, carbon black and glass beads.

Pressure Sensitive Adhesives

Any of the previously described embodiments may be formulated into pressure sensitive adhesives that may be applied to any conventional backing layer such as paper, foil, polymeric film, release liners, woven or non-woven backing material to make for example, packaging tapes, masking tapes and labels.

Hot Melt Adhesives

The composition may be added to a hot melt adhesive (HMA). The HMA may comprise a polyolefin, a tackifier and other components such as plasticizers or other additives such as oils, waxes, surfactants, fillers, color masterbatches, and the like. Preferred plasticizers include mineral oils, PAO (polyalpha-olefins), polybutenes, phthalates, and the like. Particularly preferred plasticizers include phthalates such as diisodecyl phthalate (DIOP), diisononylphthalate (DINP), dioctylphthalates (DOP). Particularly preferred oils include aliphatic naphthenic oils.

The waxes may comprise low molecular weight polymers having an average molecular weight (Mn) below 5000, preferably below 4000, more preferably below 3000, even more preferably below 2500). Preferred oils include aliphatic naphthenic oils, white oils, or the like. Preferred low molecular weight polymers include polymers of lower a olefins such as propylene, butene, pentene, and hexene. A particularly preferred polymer includes polybutene having a Mn of less than 1000. An example of such a polymer is available under the trade name PARAPOL™ 950 from ExxonMobil Chemical Company. PARAPOL™ 950 is a liquid polybutene polymer having a Mn of 950 and a kinematic viscosity of 220 cSt at 100° C., as measured by ASTM D 445.

HMAs embodiments can be used for disposable diaper and napkin chassis construction, elastic attachment in disposable goods converting, packaging, labeling, bookbinding, woodworking, and other assembly applications. Particular examples include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkins adhesive strip, industrial filtration bonding, industrial filter material lamination, filter mask lamination, surgical gown lamination, surgical drape lamination, and perishable products packaging.

In HMA applications, suitable synthetic waxes include paraffin and microcrystalline waxes having melting points within a range from about 55° C. to about 130° C. and low molecular weight polyethylene and Fischer-Tropsch waxes. The wax content is preferably from about 1 to about 35 wt. % of the total blend composition. In PSA applications, suitable oils include FLEXON® 876 or PRIMOL® 352 available from ExxonMobil Chemical Company at concentrations less than 50%.

We have also found that the compositions of the invention can be applied as an adhesive and in particular as a HMA to a wide variety of substrates including metals, paper, cardboard, mylar, and all kinds of cured and uncured rubbers, and any other suitable substrates. The rubbers to which the compositions of the invention can be applied as an adhesive may be, for example but without limitation, natural rubber, polyisoprene rubber, poly(styrene-co-butadiene) rubber, polybutadiene rubber, poly(isoprene-co-butadiene) rubber, styrene-isoprene-butadiene rubber, ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, poly(isobutylene-co-p-methylstyrene) and halogenated poly(isobutyleneco-p-methylstyrene), such as, for example, terpolymers of isobutylene derived units, p-methylstyrene derived units, and p-bromomethylstyrene derived units, and any mixtures thereof. The compositions of the invention are particularly suited to the application on dynamically vulcanized alloy (DVA) rubbers. DVAs are compositions which are obtained by blending a thermoplastic resin with a rubber. The thermoplastic resin may be, for example, a polyamide (such as any nylon), a polyester, a poly(vinylalcohol), or a poly(vinylenechloride). The rubber may be a butyl rubber, for example, a C4 to C7 isoolefin-based rubber, such as an isobutylene-based rubber, optionally containing other monomers such as isoprene and/or alkylstyrene. Dynamic vulcanization is a vulcanization process for rubbers containing a thermoplastic olefin composition wherein the rubber is vulcanized under conditions of high shear. As a result, the rubber is simultaneously cross-linked and dispersed as fine particles of a "micro-gel" within a polyolefin matrix. The unique characteristic of the dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed. Examples of DVA rubbers are disclosed in U.S. Pat. No. 4,894,408 which is incorporated herein by reference. Tire innerliners made of such DVA's exhibit significantly improved tire inflation pressure retention (IPR) with less material. This reduces air loss between the tire fillings which enables better fuel economy.

The compositions of the present invention, preferably in the form of HMA's, can be applied to the substrate, such as the rubber as explained above, by various methods known in the art, such as by lamination, co-extrusion, spraying, etc. onto the substrate. Co-extrusion of the adhesive composition of the present invention and any butyl rubber material, and specifically a DVA as explained above, is particularly preferred, as such a rubber/adhesive film can be coextruded, without cross-linking of the adhesive. This would be especially suitable in tire production processes. Usually two-component adhesives known in the art would require a low extrusion temperature of about 130° C., because at higher temperatures the adhesive would already initiate cross-linking. However, cross-linking should be avoided until the tire components are combined, and the entire tire is then cured. Materials used for tire innerliners, such as DVA's, are extruded at relatively high temperatures, such as around 230° C. Therefore, with the two-component adhesives known in the art it was not possible to co-extrude the adhesive and the tire innerliner material (such as a DVA). However, since the extrusion temperature of the adhesive compositions of the present invention can be adjusted to correspond to the extrusion temperature of the DVA, DVA/adhesive films can be produced on a standard line, which is an advantage in the tire production process. Any disclosure made hereinbelow with respect to films also and in particular applies to films containing several layers, among them at least one layer containing a DVA as explained above and at least one layer containing the adhesive compositions of the present invention.

Films

Films having one or more layers comprising the compositions disclosed herein may be employed as either mono- or multi-layer films or laminates and may be manufactured by any conventional process, including simple bubble extrusion, biaxial orientation processes (such as tenter frames, trapped bubble, or double bubble processes), simple cast/sheet extrusion-lamination, co-extrusion, lamination, extrusion coating, and co-extrusion coating, blowing and casting, etc. Should a multilayer film be desired, such may be obtained from a monolayer blown or cast film that can be combined with the other layers though conventional techniques such as adhesive lamination or extrusion lamination. Monolayer and co-extruded films can also be produced by biaxial orientation processes. Extrusion coating is another suitable process. A heat-sealable film comprising a sealing layer as described herein may be extrusion coated onto a substrate either in the form of a monolayer or a multi-layer co-extruded substrate. A multi-layer extrudate can be produced via multiple extruders on multi-station tandem lines. The layers may be co-extruded with other layer(s) of a multi-layer film or the sealing layer can be laminated onto another layer(s) or substrate, including paper, foil, oriented polypropylene, polyamides, polyesters, polyethylenes, polyethylene terephthalate, metal and metallized substrates and other substrates discussed herein.

The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene or oriented polyester layer or the polyethylene and polypropylene can be co-extruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

The layers of such films may comprise any polyolefin, polar polymer as described herein, cationic polymers including polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

Other preferred layers can be paper, wood, cardboard, metal, rubber as explained above (including, but not limited to DVAs), metal foils (such as aluminum foil and tin foil), metallized surfaces, glass (including silicon oxide (SiOx) coatings applied by evaporating silicon oxide onto a film surface), fabric, spunbonded fibers, and non-wovens (particularly polypropylene spunbonded fibers or non-wovens), and substrates coated with inks, dyes, pigments, PVC and the like.

The films may vary in thickness depending on the intended application, however films of a thickness from 1 to 250 µm are usually suitable. Films intended for packaging are usually from 10 to 60 µm thick. In many cases, the sealing layer will have a thickness between 0.5 and 60 µm, more preferably between 10 and 50 µm, and most preferably between 15 and 30 µm. There may be a sealing layer on both the inner and outer surfaces of the film or the sealing layer may be present on only the inner or the outer surface.

Film additives such as cling agents, antiblock agents, antioxidants, slip additives, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium stearate, carbon black, low molecular weight resins and glass beads.

In one embodiment, the layer(s) may comprise a crosslinking agent. Preferred crosslinking agents include alcohols, polyols, amines, diamines and/or triamines. Examples of crosslinking agents useful in this invention include polyamines such as ethylenediamine, diethylenetriamine, hexamethylenediamine, diethylaminopropylamine, and/or menthanediamine.

Preferred antioxidants include phenolic antioxidants, such as Irganox 1010, Irganox, 1076 both available from Ciba-Geigy and 3,5 tertiary-butyl 4-hydroxy toluene. Preferred oils include paraffinic or napthenic oils such as Primol 352, or Primol 876 available from ExxonMobil Chemical France, S.A. in Paris, France. More preferred oils include aliphatic napthenic oils, white oils or the like.

Preferred plasticizers and/or adjuvants include mineral oils, polybutenes, phthalates and the like. Particularly preferred plasticizers include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex.

Preferred film processing aids, lubricants, waxes, and/or oils include low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER 101. Preferred low Mn polymers include polymers of lower alpha olefins such as propylene, butene, pentene, hexene and the like. A particularly preferred polymer includes polybutene having an Mn of less than 1000. An example of such a polymer is available under the trade name PARAPOL 950 from Exxon Chemical Company. PARAPOL 950 is an liquid polybutene polymer having an Mn of 950 and a kinematic viscosity of 220 cSt at 100 C, as measured by ASTM D 445.

In another embodiment one more layers may be modified by corona treatment, electron beam irradiation, gamma irradiation, flame treatment or microwave. In a preferred embodiment one or both of the surface layers is modified by corona treatment.

The films described above may be used as stretch and/or cling films. Stretch/cling films are used in various bundling, packaging and palletizing operations. To impart cling properties to, or improve the cling properties of, a particular film, a number of well-known tackifying additives have been utilized.

Common tackifying additives include polybutenes, terpene resins, and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/clings films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly C4 to C12 olefins. Particularly preferred are polypropylene and linear low density polyethylene (LLDPE). Suitable polypropylene is normally solid and isotactic, i.e., greater than 90% hot heptane insolubles, having wide ranging melt flow rates of from about 0.1 to about 300 g/10 min. Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

We will now discuss the various applications of the compositions of the invention in further detail by way of example only. In the following examples, all parts, proportions, and percentages are by weight unless otherwise indicated. The following materials were used:

COMPARATIVE EXAMPLES

| | |
|---|---|
| EMPA 851N | blend of 50% Exact 8203 (PE) and 50% resin derived from dicyclopentadiene (DCPD, softening point 125° C.) |
| EMPA 861N | blend of 50% Exact 8203 (PE) and 50% EMFR100 grafted with MA |
| PA 610N | blend of 50% PP (MFR 2.9 @ 230° C.) and 50% resin derived from DCPD (softening point 125° C.) |
| in which | |
| Exact 8203 | PE, melt index (MI) 3.0 (as measured following ASTM D-1238); density 0.882 kg/l |
| Exact 8210 | PE, melt index (MI) 10.0 (as measured following ASTM D-1238); density 0.882 kg/l |
| EMFR 100 | 100° C. SP DCPD based HCR; fully hydrogenated and grafted with 2.5% MA. |

Examples of the Invention

Compositions of the invention were prepared by grafting the blends for EMPA 861N and PA 610N as set out in the following Table 1:

TABLE 1

| | 2144 | 2145 | 2146 | 2148 | 2149 | 2150 |
|---|---|---|---|---|---|---|
| BLEND COMPOSITION (PERCENTAGE): | | | | | | |
| EMPA 851N | 98.3 | 96.5 | 96.5 | | | |
| PA 610N | | | | 98.3 | 98.3 | 98.3 |
| MA | 1.6 | 3.2 | 3.2 | 1.6 | 1.6 | 3.2 |
| LUPEROX 101 PURE PEROXIDE | .10 | .30 | .20 | .05 | .10 | .10 |

TABLE 1-continued

|  | 2144 | 2145 | 2146 | 2148 | 2149 | 2150 |
|---|---|---|---|---|---|---|
| COMPOUNDING CONDITIONS | | | | | | |
| FEED RATE Kg/h | 7 | 7 | 7 | 7 | 7 | 7 |
| SCREW SPEED RPM | 200 | 200 | 200 | 150 | 150 | 150 |
| TEMPERATURE ZONE NR 1 | 160 | 156 | 160 | 161 | 160 | 160 |
| TEMPERATURE ZONE NR 2 | 190 | 184 | 184 | 185 | 183 | 184 |
| TEMPERATURE ZONE NR 3 | 210 | 204 | 204 | 175 | 175 | 175 |
| TEMPERATURE ZONE NR 4 | 180 | 151 | 151 | 143 | 142 | 142 |
| TEMPERATURE AT DIE (° C.) | 140 | 150 | 140 | 190 | 190 | 190 |
| MA ANALYSIS, wt % | 0.85 | 1.71 | NA | 0.27 | NA | 0.50 |
| MFR (Davenport @ 125° C., 2.16 kg), g/10 min | 1.0 | 0.1 | 0.1 | 51.3 | 103.0 | 91.2 |

As disclosed in detail in Table 1, six compositions were prepared; three based on blends of PE and DCPD (2144-2146) and three based on blends of PP and DCPD (2148-2150). The blends were grafted with maleic anhydride (MA) as monomer in the presence of a free radical intiator in the form of peroxide. The peroxide (Luperox 101 from Arkema) was diluted at a 10% concentration in a mineral oil prior to feeding in order to improve the metering. The compositions were prepared under shear in a twin screw extruder. The melt flow rate (MFR) is presented for each of the prepared compositions in Table 1.

TABLE 2

| Sample | Total weight of blend (g) | Total weight after grafting (g) | Total increase (wt %) | Percentage resin (%) | Percentage PP or PE (%) |
|---|---|---|---|---|---|
| 2144 | 9.31 | 9.61 | 3.20 | 43.90 | 56.10 |
| 2145 | 10.05 | 10.33 | 2.80 | 42.20 | 57.80 |
| 2148 | 10.13 | 10.50 | 3.60 | 52.20 | 47.80 |
| 2150 | 10.08 | 10.40 | 3.10 | 52.20 | 47.80 |

Table 2 shows the percentage of resin to PP or PE for the sample compositions 2144, 2145, 2148 and 2150.

Samples of EMPA 851N, 2144 and 2145 were pressed onto a PE film consisting of Exact 8203 at 190° C. for a total melting and pressing time of 6 minutes. Each of the samples weighed 3 g. The film was corona treated (using a Sherman solid state treater generator, model GX10) at 0.25 kW in two passes at a speed of 5 m/min. FIG. 1 shows the surface tension retention for the samples of the invention based on 2144 and 2145 and for an non-grafted, non-functionalized based film of EMPA 851N. The surface tension retention is measured in accordance with ASTM D 2578/94.

As is evident from FIG. 1, functionalization increases the surface tension retention of the film. The surface tension of EMPA 851N drops to an unacceptable limit (below 38 dyne/cm) in less than a week, whereas the samples of the invention retain an acceptable surface tension retention even after one month.

Figure 2:
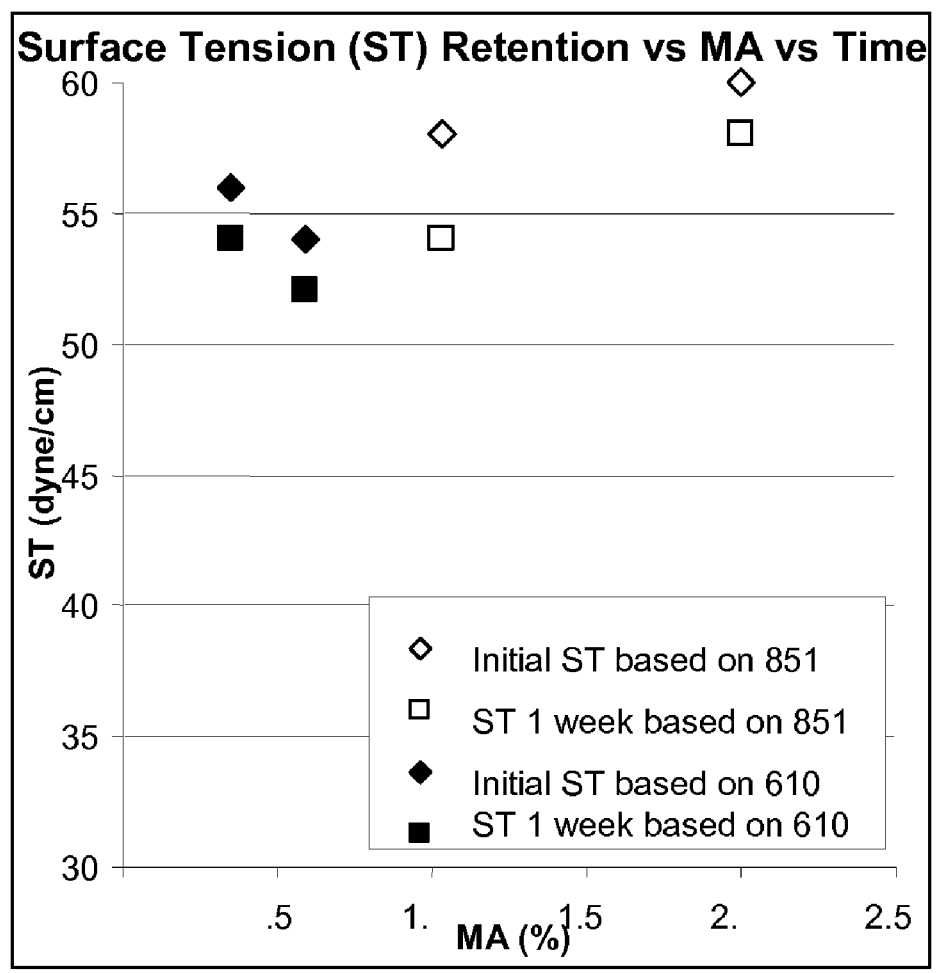
FIG. 2 presents the surface tension retention of a polyethylene film, a polypropylene film and polyethylene and polypropylene based composition of the invention.

Samples of EMPA 851N and PA 610N were grafted with various concentrations of MA in the same way as the samples of the invention as set out in Table 1 above. The functionalized samples were pressed onto a base film consisting of Exact 8203. Each of the samples weighed 3 g. The film was corona treated at 0.40 kW in two passes at a speed of 5 m/min. FIG. 2 shows the surface tension retention as a function of the MA content and time.

As is evident from FIG. 2, with increase of the MA, the surface tension retention improves. The samples of the invention which are based on EMPA 851N (polyethylene) perform better than the samples which are based on PA 610N (polypropylene).

Peel tests were performed on the comparative samples and samples of the invention. Test samples were prepared by generating a strip of polymer 1 mm thick, 1.4 cm wide and 15 cm long. Pressing occurred at 190° C., 3 minute preheat and 1 minute pressing at 100 kN using a Fontijne press (manufactured by Fontijne Holland) on the following substrates aluminium, Mylar™ and Froevi™ paper. The sample was pressed with a spacer so that the calculated adhesive thickness is 0.5 mm. The sheets were then cut in 25 mm strips discarding the edge portions.

The thus obtained test samples were then peel tested using the dot T-peel test on a Zwick 1445 tensile machine following ASTM D1876. From these measurements the maximum force (in N/25 mm) and failure type were recorded as set out in the below Table 3. Peeling the so formed Aluminium and polyester laminates occurred at room temperature, the Froevi™ laminates were peeled at −20° C.

In Table 3, AF indicates adhesive failure (with adhesive on one side of the polymer); CF indicates cohesion failure (adhesive on both sides), SF indicates substrate failure and PT indicates substrate tear.

From Table 3, it is immediately clear that the compositions of the invention perform much better than the compositions of the comparative examples.

TABLE 3

| Material | Aluminium | Mylar | Froevi (@ −20° C.) |
|---|---|---|---|
| PA 851N | 87 AF | 56 AF | 12 PT |
| PA 861N | 19 AF | 11 AF | 6 PT |
| 50% E 5320 in E 8210 | 36 AF | 30 AF | 7 PT |
| 2144 | 232 SF | 145 AF | 4 PT |
| 2145 | 253 SF | 145 AF | 5 PT |
| Exact 8210 | 1.8 AF | 0.3 AF | 6 PT |

Finally, films were prepared from compositions of the invention and comparative compositions as set out above by three layer film extrusion. The extruded films had three layers A-B-C, in which A was a low density polyethylene (LD151BW, melt index (MI) is 3 g/10 min) of a thickness of 20 μm, B was a polyethylene layer (Exceed 3518CB, MI 3.5 g/10 min) of a thickness of 10 μm, and C was a protective film layer of the composition as set out in below Table 4 of a thickness of 20 μm.

Peel tests were performed on the comparative samples and samples of the invention following FINAT (Federation Internationale des fabricants et transformateurs d'adhesifs et thermocollants sur papiers et autres supports) testing method FTM 1. This method defines both the film sample preparation and data recording. The tests were conducted in accordance with FTM 1 with the following changes: the substrates were cleaned with isopropyl alcohol (IPA) instead of acetone/heptane. Furthermore, in addition to stainless steel, the film was applied on the following substrates: polycarbonate (PC), polymethylmethacrylate (PMMA), glass, polyvinylchloride (PVC), aluminum and blank wood. None of the tested films adhered to the blank wood substrate.

Test samples were prepared by applying test strips of the extruded films on the various substrates listed in Table 4. The strips were left on the substrates for 20 minutes before they were peeled. During peeling, the average force was measured (in N/25 mm) and the failure type was recorded as set out in Table 4. The same abbreviation (AF) has been used as in Table 3. In Table 4, "Dep." indicates that after close inspection, deposits were found on the substrate. The samples of the invention clearly perform better than the comparative examples.

TABLE 4

| Protective Film | PC | PMMA | Glass | Steel | PVC | Wood | Aluminium |
|---|---|---|---|---|---|---|---|
| 100% Exact 8203 | 0.0 AF | 0.1 AF | 0.0 AF | 0.0 AF | 0.1 AF | — | 0.0 AF |
| 80% Exact 8203 + 20% EMPA 851N | 3.0 AF | 2.9 Dep. | 3.2 Dep. | 2.9 Dep. | 0.9 AF | — | 0.4 AF |
| 90% Exact 8203 + 10% 2144 | 1.0 AF | 1.0 AF | 0.3 AF | 1.0 AF | 0.2 AF | — | 0.1 AF |
| 80% Exact 8203 + 20% 2144 | 2.5 AF | 2.0 AF | 1.9 AF | 1.7 AF | 0.8 AF | — | 0.4 AF |
| 60% Exact 8203 + 40% 2144 | 3.7 AF | 4.1 AF | 3.3 AF | 4.1 AF | 1.6 AF | — | 1.0 AF |

The process of the invention results in a composition in which the hydrocarbon resin and the polyolefin are highly compatibilized. The hydrocarbon resin is compatible with its grafted counterpart. The polyolefin is compatible with its grafted counterpart, whilst the grafted polyolefin and grafted hydrocarbon resin are also compatible with each other through their common grafted components or through the formation of co-graft molecules between the hydrocarbon resin and the polyolefin. This results in a composition which has an improved compatibility over conventional functionalized compositions because in addition to the compatibility of the resin and the polyolefin with their respective grafted counterparts, both the grafted polyolefin and hydrocarbon resin are mutually compatible. Compatibility together with the addition of the grafting monomer under shear result in a composition with a high level of dispersion. To illustrate this, we refer to FIGS. 3a and 3b.

Figure 3A:
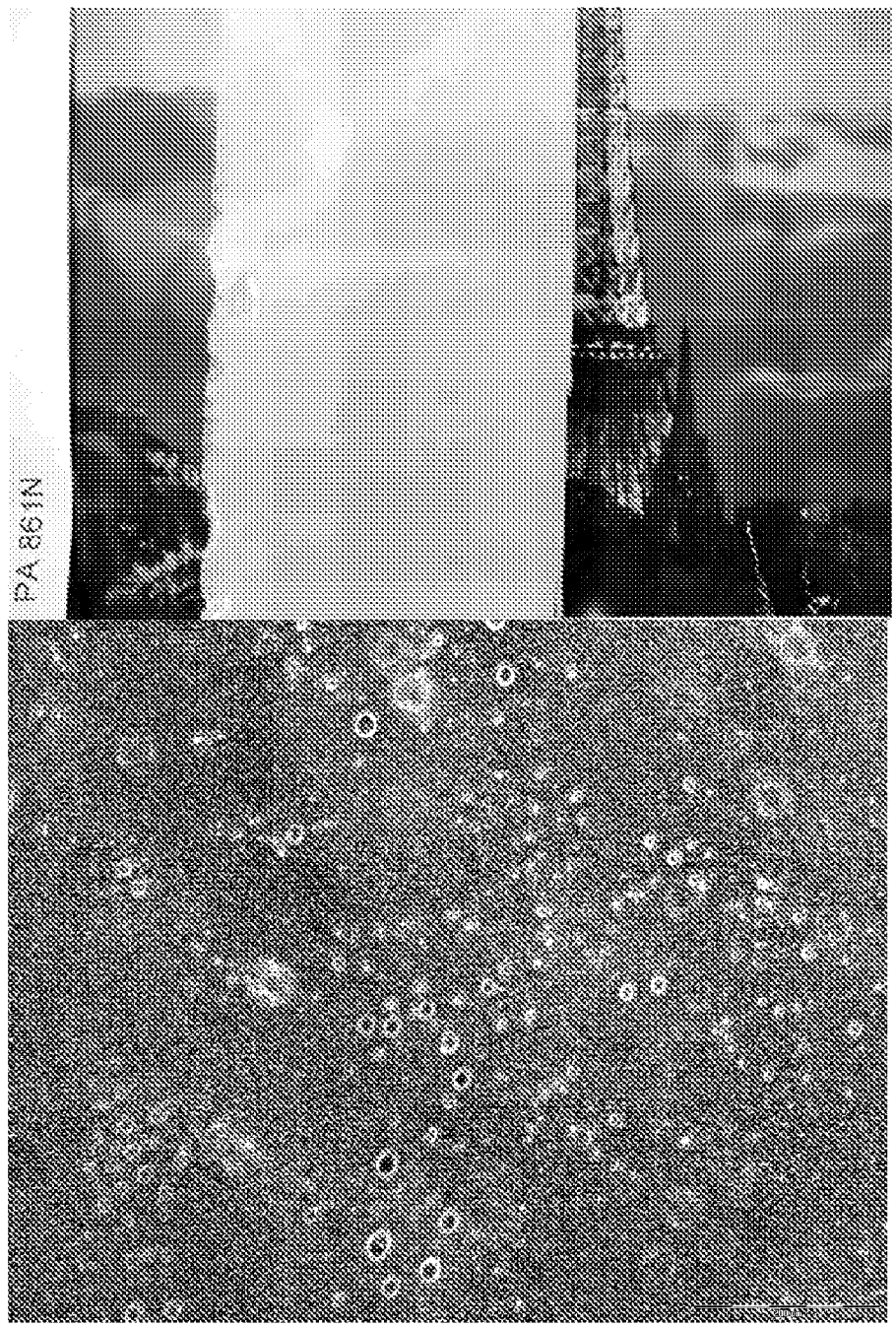
FIGS. 3a and 3b present comparative examples of a film together with a film of the invention.

A plaque was prepared from EMPA 861N by pressing a sample of the EMPA 861N composition between Mylar™ sheets at a temperature of 200° C. for 5 min. to a thickness of 1 mm and quenching the sample by means of a waterbath down to room temperature. The top image in FIG. 3a shows the plaque at a distance of 1 cm from a reference picture. The plaque is kept at 1 cm by means of two small spacers at either end. It can clearly be seen that the plaque is opaque. This is because of the incompatibilities that exist in the matrix which causes phase separation and hence domains large enough to create the opacity/high degree of haze. To examine this further a thin film of the same sample was pressed between two microscope cover slips on a temperature controlled hot stage at 200° C. for 5 min. It was then cooled at a controlled rate of 20° C./min down to room temperature. The resultant film was then examined with a 20× objective under a phase contrast microscope (the magnification can be seen by the scale bar on the photomicrograph). The phase incompatibilities can be clearly seen in the bottom image of FIG. 3a.

Figure 3B:
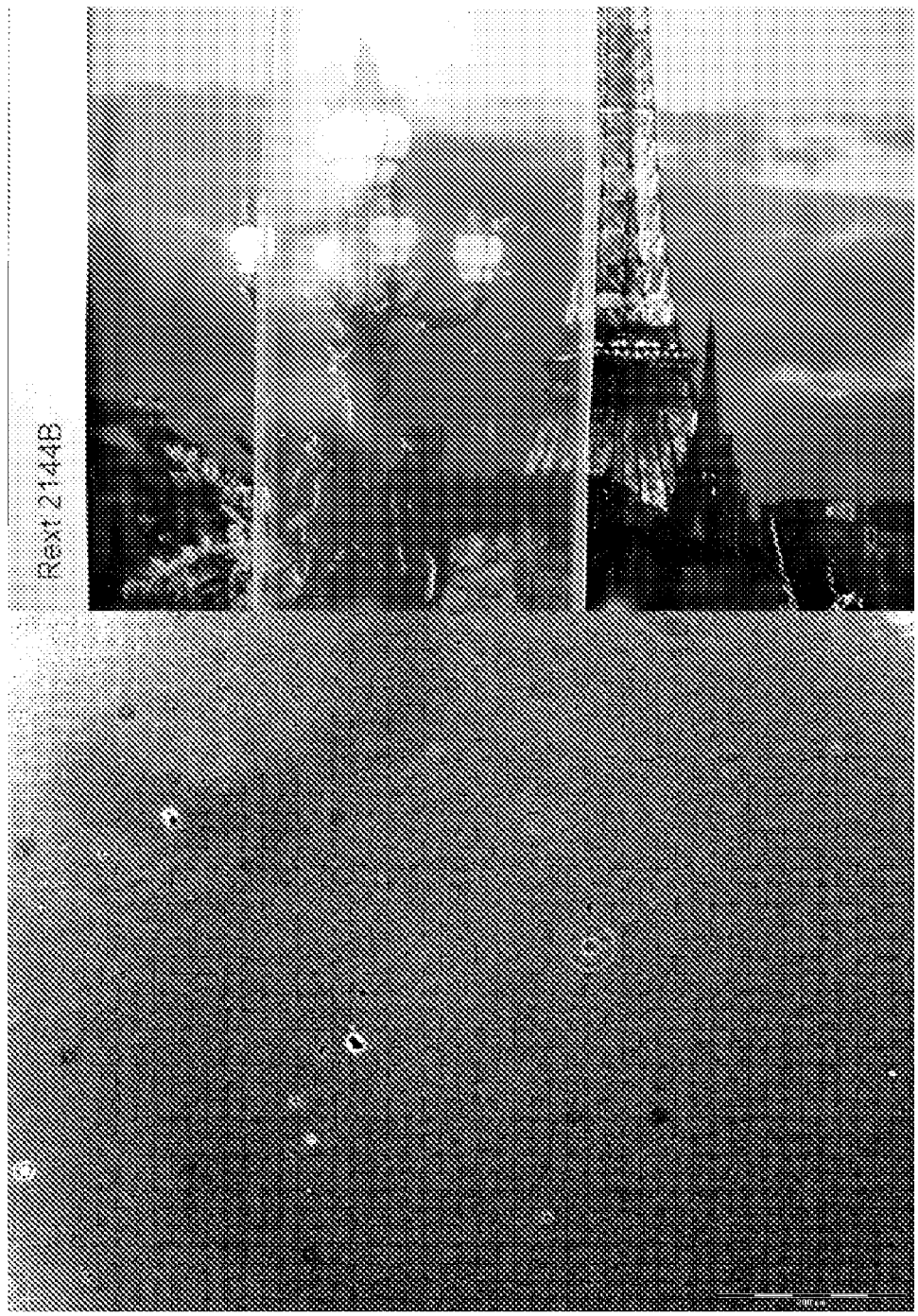

A similar plaque was prepared in the same way for composition 2144. The image at the top of FIG. 3b shows this plaque. It can be clearly seen that the plaque is almost completely transparent. This demonstrates the much improved compatibilities between the components. A thin film was also prepared for microscopic evaluation by the method described above. The image at the bottom of FIG. 3b, clearly shows that the phase compatibilities of the components have been much improved by the method and materials of this invention. Thus from FIG. 3, it is immediately evident that the film of the invention has a much better compatibility and dispersion of the hydrocarbons and the polyolefins, which results in blends which have improved transparency over the blends of the comparative example.

Additional adhesion tests were carried out on a hot melt adhesive composition consisting of 2144 as defined in Table 1. The additional tests are described in the following:

A thin film of 2144 adhesive was inserted between two sheets of polyamide 6 (Goodfellow LS 264511, a crystalline Nylon 6 material of 5 μm thickness) to form a sandwich structure. The structure was pressed at 190° C. at a pressure of 100 KN in a Fontijne press. After cooling of the structure, the sheets of polyamide were elongated to breaking when trying to peel the sheets apart.

A similar test was performed on 2144 applied to other substrates. A T-peel sample was prepared for DVA rubber substrates. A thin film of 2144 adhesive was pressed in between two layers of DVA rubber. A thin film of mylar was inserted between the DVA rubber sheets to allow peel testing and to prevent DVA/DVA adhesion. This sample was placed in a fontijne press set at 150° C. using a force of 100 KN for a pressure time of 10 seconds. Sample was then peeled and the DVA substrate elongated until it broke.

Another test was performed on a T-peel sample of uncured butyl rubber to uncured butyl rubber using 2144 adhesive. The butyl rubber had the formulation as set out in the below Table 5. In this Table, SBR is styrene-butadiene rubber, BR 1,4-cis is 1,4-cis-polybutadiene, N-660 is a carbon black grade, TDAE oil refers to a treated distillated aromatic extract used as an extender oil, Flectol H is 1,2-dihydro-2,2,4-trimethylquinoline (TMQ), and ZnO/stearic acid/sulfur is the cure system. Perkacit CBS is N-cyclohexyl benzothiazyl-2-sulfenamide and Perkacit DPG is diphenylguanidine. Both Perkacit materials are used as cure accelerators. The unit "phr" means "parts per hundred rubber". A thin film of 2144 was placed between two sheets of uncured rubber carcass compound. Similar to the above test, a piece of mylar film was used to prevent adhesion of the rubber layers. This sample was cured in a Fontijne press set at 190° C. using a force of 100 KN for a pressure time of 10 minutes. After sample had cooled to room temperature it was cut in small strips which were then peeled. The sample strips all elongated and then broke.

TABLE 5

| Butyl Rubber | Compound (phr) |
|---|---|
| Natural rubber | 50 |
| SBR 1500 | 25 |
| BR 1,4-cis | 25 |
| GPF N-660 | 50 |
| Oil TDAE | 10 |
| Flectol H | 1 |
| Stearic acid | 1.5 |
| ZnO | 3 |
| Sulfur | 3 |
| Perkacit CBS | 1.1 |
| Perkacit DPG | 0.1 |

Similar to the above tests, adhesion of DVA to uncured butyl rubbers using 2144 as an adhesive was tested. The Sample consisting of DVA rubber adhered to a layer of uncured butyl rubber using 2144 was prepared and cured as above. The Sample was again pressed at 150° C. using a force of 100 KN for a pressure time of 10 seconds. After sample had cooled it was peeled. The DVA substrate layer elongated and then broke.

Finally, the adhesion of DVA to cured butyl using 2144 was tested. The Sample was prepared in the same way as above. The butyl rubber layer was however pre-cured. This sample was placed in a Fontijne press set at 150° C. using a force of 100 KN for a pressure time of 10 seconds. After the sample had cooled the layers were peeled. The force required to separate the DVA layer from the cured rubber layer was 1520 g/cm and the adhesive was completely retained on the DVA layer.

The present invention thus provides compositions and a process for preparing the compositions which comprise a polyolefin and a hydrocarbon resin together with their grafted counterparts. In this functionalized composition the polyolefin and hydrocarbon resin are compatibilized which in turn increases the compatibility of the composition with other compositions and substrates.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for preparing a functionalized polymer composition comprising:
   a) providing a hydrocarbon resin;
   b) providing a polyolefin, wherein the polyolefin is a polyethylene polymer that has a molecular weight (Mw) of at least 20000 or a C3 to C40 polyolefin having a molecular weight (Mw) of 50000 or more;
   c) providing a graft monomer;
   the process further comprising
   d) dispersing the hydrocarbon resin in the polyolefin to form a dispersion, followed by
   e) adding the graft monomer under shear to said dispersion;
   wherein the hydrocarbon resin is compatible with the polyolefin, wherein a radical initiator is added to the dispersion in or after step e), wherein a weight ratio of the radical initiator to the graft monomer in the dispersion is less than 1:2, and further comprising grafting the graft monomer in the dispersion to the hydrocarbon resin and the polyolefin, whereby the hydrocarbon resin in the functionalized polymer composition is compatible with the grafted hydrocarbon resin, the polyolefin in the functionalized polymer composition is compatible with the grafted polyolefin, and the grafted hydrocarbon resin is compatible with the grafted polyolefin.

2. The process according to claim 1, further comprising extruding the dispersion, wherein the monomer is added to the dispersion prior to the extrusion of the dispersion.

3. The process according to claim 1, wherein the graft monomer before grafting has an olefinic bond through which it is grafted to the material, the olefinic bond being an α, β olefinic bond and the graft monomer is grafted to the hydrocarbon resin through the α, β olefinic bond.

4. A composition comprising:
   a) a hydrocarbon resin,
   b) a polyolefin compatible with the hydrocarbon resin, wherein the polyolefin is a polyethylene polymer that has a molecular weight (Mw) of at least 20000 or a C3 to C40 polyolefin having a molecular weight (Mw) of 50000 or more;
   c) a grafted counterpart of the polyolefin comprising said polyolefin reacted with a graft monomer, wherein the polyolefin in the composition is compatible with the grafted counterpart of the polyolefin, and
   d) a grafted counterpart of the hydrocarbon resin comprising said hydrocarbon resin reacted with said same graft monomer, wherein the hydrocarbon resin in the composition is compatible with the grafted counterpart of the hydrocarbon resin;
   wherein the composition is obtained by a process comprising dispersing the hydrocarbon resin in the polyolefin to form a dispersion, followed by adding the graft monomer under shear to said dispersion, adding a radical initiator to the dispersion with or after the graft monomer addition, and grafting the graft monomer in the dispersion to the hydrocarbon resin and the polyolefin;
   whereby the grafted hydrocarbon resin is compatible with the grafted hydrocarbon resin.

5. The process of claim 1, wherein the hydrocarbon resin contains less than 5% olefinic protons prior to grafting.

6. The process of claim 1, wherein the hydrocarbon resin contains 0 to 30% aromatics.

7. The process of claim 1, wherein the polyolefin comprises a polymer comprising ethylene or propylene and having a Composition Distribution Breadth Index (CDBI) greater than 50% and a polydispersity of less than 4.

8. The process of claim 1, wherein the grafted dispersion comprises between 0.1 and 99 wt% grafted polyolefins.

9. The process of claim 1, wherein the hydrocarbon resin comprises an oligomer and wherein the oligomer:graft monomer mole ratio in the grafted oligomer is between 2:1 and 1:2.

10. An adhesive composition obtained by blending a polymer and an additive composition, wherein the additive composition comprises:
    a) a hydrocarbon resin,
    b) a polyolefin compatible with the hydrocarbon resin, wherein the polyolefin is a polyethylene polymer that has a molecular weight (Mw) of at least 20000 or a C3 to C40 polyolefin having a molecular weight (Mw) of 50000 or more;
    c) a grafted counterpart of the polyolefin comprising said polyolefin reacted with a graft monomer, wherein the polyolefin in the additive composition is compatible with the grafted counterpart of the polyolefin, and
    d) a grafted counterpart of the hydrocarbon resin comprising said hydrocarbon resin reacted with said same graft monomer, wherein the hydrocarbon resin in the additive composition is compatible with the grafted counterpart of the hydrocarbon resin;

wherein the additive composition is obtained by a process comprising dispersing the hydrocarbon resin in the polyolefin to form a dispersion, followed by adding the graft monomer under shear to said dispersion, adding a radical initiator to the dispersion with or after the graft monomer addition, and grafting the graft monomer in the dispersion to the hydrocarbon resin and the polyolefin;

whereby the grafted hydrocarbon resin is compatible with the grafted hydrocarbon resin.

11. The composition of claim 10, wherein the composition is a hot melt pressure sensitive adhesive, wherein the blend polymer comprises a block copolymer, and wherein the hot melt pressure sensitive adhesive comprises:
 (a) 100 parts by weight of the block copolymer;
 (b) 50-150 phr of the additive composition; and
 (c) up to 50 phr of an extender oil.

12. The hot melt pressure sensitive adhesive of claim 11 formed into a film.

13. The film of claim 12, wherein the film additionally contains a polyolefin.

14. The film of claim 12, wherein the film is a multi-layer film in which at least one layer comprises the hot melt pressure sensitive adhesive.

15. The film of claim 14, wherein at least one layer of the multi-layer film comprises a rubber, wherein the rubber is selected from natural rubber, polyisoprene rubber, poly(styrene-co-butadiene) rubber, polybutadiene rubber, poly(isoprene-co-butadiene) rubber, styrene-isoprene-butadiene rubber, ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, poly(isobutylene-co-p-methylstyrene) and halogenated poly(isobutylene-co-p-methylstyrene), and any mixtures thereof.

16. The film of claim 15, wherein the rubber is used in combination with a thermoplastic resin selected from a polyamide, a polyester, a poly(vinylalcohol), or a poly(vinylenechloride).

17. The film of claim 16, wherein the polyamide is nylon, and the rubber is an isobutylene-based rubber, and the nylon and the isobutylene-based rubber are present in a dynamically vulcanized alloy (DVA).

18. The film of claim 12, wherein the film is formed by coextrusion.

19. Method of producing an adhesive composition comprising coextruded film, the method comprising:
 a) providing a hydrocarbon resin
 b) providing a polyolefin, wherein the polyolefin is a polyethylene polymer that has a molecular weight (Mw) of at least 20000 or a C3 to C40 polyolefin having a molecular weight (Mw) of 50000 or more;
 c) dispersing the hydrocarbon resin in the polyolefin to form a dispersion, followed by adding the graft monomer under shear to said dispersion, whereby said polyolefin is reacted with the graft monomer, and
 d) said hydrocarbon resin is reacted with said same graft monomer, and
 e) coextruding the dispersion with at least one layer containing a rubber selected from natural rubber, polyisoprene rubber, poly(styrene-co-butadiene) rubber, polybutadiene rubber, poly(isoprene-co-butadiene) rubber, styrene-isoprene-butadiene rubber, ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, poly(isobutylene-co-p-methylstyrene) and halogenated poly(isobutylene-co-p-methylstyrene), and any mixtures thereof.

* * * * *